United States Patent
Blanc et al.

(10) Patent No.: US 8,374,735 B2
(45) Date of Patent: Feb. 12, 2013

(54) METHOD AND DEVICE FOR REDUCING ACTUAL LOADS GENERATED ON AIRPLANE BY AN AERODYNAMIC DISTURBANCE

(75) Inventors: Sébastien Blanc, La Salvetat Saint Gilles (FR); Marc Humbert, Tournefeuille (FR)

(73) Assignee: Airbus Operations (SAS), Toulouse Cedex (FR)

( * ) Notice: Subject to any disclaimer, the term of this patent is extended or adjusted under 35 U.S.C. 154(b) by 81 days.

(21) Appl. No.: 13/098,592

(22) Filed: May 2, 2011

(65) Prior Publication Data
US 2011/0266399 A1 Nov. 3, 2011

(30) Foreign Application Priority Data
May 3, 2010 (FR) ...................................... 10 53391

(51) Int. Cl.
*G05D 1/00* (2006.01)
(52) U.S. Cl. .......................................................... 701/3
(58) Field of Classification Search ................. 701/3, 4, 701/7–10; 258/1.8; 244/4 R, 24, 75.1
See application file for complete search history.

(56) References Cited

U.S. PATENT DOCUMENTS

| | | | | |
|---|---|---|---|---|
| 4,479,620 A | * | 10/1984 | Rogers et al. | 244/195 |
| 6,161,801 A | * | 12/2000 | Kelm et al. | 244/76 C |
| 6,928,340 B2 | * | 8/2005 | Van De Kreeke et al. | 701/4 |
| 2008/0251648 A1 | | 10/2008 | Colomer et al. | |
| 2008/0265104 A1 | * | 10/2008 | Fabre-Raimbault et al. | 244/76 C |
| 2009/0014595 A1 | * | 1/2009 | Rougelot et al. | 244/228 |
| 2009/0314900 A1 | * | 12/2009 | Puig et al. | 244/76 C |

FOREIGN PATENT DOCUMENTS

| | | |
|---|---|---|
| EP | 0435764 | 7/1991 |
| EP | 0953503 | 11/1999 |
| FR | 2891802 | 4/2007 |
| FR | 2912991 | 8/2008 |
| FR | 2927428 | 8/2009 |

OTHER PUBLICATIONS

French Patent Office, International Search Report FR 1053391 (2 pgs.), Jan. 11, 2011.

* cited by examiner

*Primary Examiner* — Mary Cheung
(74) *Attorney, Agent, or Firm* — Wood, Herron & Evans, LLP

(57) ABSTRACT

A method and device for reducing actual loads generated on airplane by an aerodynamic disturbance is provided, the device including means for determining a load exceeding envelope and means for determining deflection orders of airplane control surfaces to reduce loads applied on the latter, when the airplane flies inside the load exceeding envelope. More specifically, a flight envelope of the airplane is determined and used with theoretical loads applied to the aircraft to produce the load exceeding envelope based on couples of the flight envelope with theoretical loads that equal or exceed a load threshold.

9 Claims, 2 Drawing Sheets

METHOD AND DEVICE FOR REDUCING ACTUAL LOADS GENERATED ON AIRPLANE BY AN AERODYNAMIC DISTURBANCE

TECHNICAL FIELD

The present invention relates to a method and a device for reducing actual loads generated on an airplane by an aerodynamic disturbance, including due to the wind, as well an airplane provided with such a device.

BACKGROUND

It is known that, within the scope of a certification for transport airplanes as far as loads are being applied to them, several cases are to be considered of regulatory dimensioning respectively related to:
  a maneuver;
  a discrete gust; and
  a continuous turbulence.

Those last two load cases are sometimes more dimensioning than load cases related to a maneuver. It is therefore advantageous to be able to reduce load levels associated with a discrete gust and to a continuous turbulence, allowing, more specifically, a gain on the structural mass of the airplane airfoils to be realized.

From the French patent application FR-2,912,991, a method and a device are already known, intended for dynamically reducing loads generated on a transport airplane by an aerodynamic disturbance, including due to the wind (discrete gust, continuous turbulence, etc.). Such device provides a dynamic control of loads generated on the airfoils of the airplane through an incidence measurement by means of an incidence probe. When the incidence angle of the airplane being measured is higher than a predetermined threshold, the device detects an aerodynamic disturbance and determines deflection orders of the ailerons in the airplane, so as to tilt them by a particular deflection angle and this, at a maximum deflection speed.

Such a device thereby allows to accurately and reliably detect an aerodynamic disturbance, able to generate an increase of loads in the airfoils of the airplane. Moreover, the deflection of ailerons, directly determined on the cause stimulating the structure of the airplane, is achieved at a maximum speed, allowing to limit the wing bending caused by the disturbance and to reduce the load level existing at the level of the airfoils.

Using such a dynamic reduction of loads, a gain is thus able to be obtained on the structural mass of the airfoils of the airplane.

The present invention aims at reducing the structural mass of the airfoil of an airplane and, in particular, at further reducing it when the airplane is provided with a device for dynamically reducing loads, for instance of the above described type.

SUMMARY OF THE INVENTION

To this end, the invention relates to a method for reducing actual loads generated on an airplane by an aerodynamic disturbance, including due to the wind, said airplane comprising control surfaces arranged on its wings. According to this invention, said method is remarkable in that:

A/ in a preliminary step, a load exceeding envelope is determined, being defined by couples of values of altitude and speed available to said airplane (AC), for which the actual loads applied on said airplane are able to be at least equal to one predefined load threshold;

B/ during a flight of the airplane, the following steps are repeatedly and automatically performed:
  i) a monitoring is achieved of the usual altitude and speed of said airplane (AC) for detecting whether the latter flies in said load exceeding envelope;
  ii) when said airplane flies in said load exceeding envelope, deflection orders are determined of at least some of said control surfaces for reducing the actual load applied on said airplane, such deflection orders being such that they generate a deflection of said control surfaces respectively according to a particular deflection angle; and
  iii) the thus determined deflection orders are applied to said control surfaces.

Thus, by means of the present invention, a static preventive deflection is performed, during a flight, of at least some of the control surfaces of an airplane, as soon as the latter enters a theoretically determined load exceeding envelope, for instance by digital simulations and/or experiments. This way, the airplane is protected from possible actual aerodynamic disturbances that it could subsequently meet during the flight, the <<protected>> configuration of the airplane allowing it the loads generated to be reduced, including on its airfoils, upon such disturbances.

In other words, in the present invention, a possible aerodynamic disturbance is anticipated, deflecting in a preventive way control surfaces of an airplane. Acting this way, the airfoils of the airplane could be submitted to an increase of loads without any risk to exceed dimensioning limit loads of the structure of the airplane (i.e. the maximum loads the considered structure parts are able to withstand) (i.e. the airfoils) without permanent deformations occurring).

It should be noticed, in the French patent application FR-2,912,991, that the deflection of the control surfaces is performed upon an aerodynamic disturbance being detected by sensors. On the contrary, in the present invention, control surfaces are preventively deflected before aerodynamic disturbances possibly occur.

Using such a reduction of loads, a gain is able to be more specifically reached on the a structural mass of the aerofoils of an airplane, allowing, in particular, to reduce the manufacturing and the operating cost of said airplane. Additionally, the present invention could be implemented in any airplane and, in particular in any transport airplane provided with one or more usual devices for reducing loads (for instance of the type described in the French patent application FR-2,912,991), so as to further reduce the structural mass of the aerofoils of the airplane.

Within the scope of the present invention, it is considered that an aerodynamic disturbance could be:
  a discrete gust, that is a simplified wind modeling aimed at representing an isolated turbulence with an extreme intensity; or
  a continuous turbulence, that is a wind modeling aimed at representing atmospheric disturbances lasting for a long period of time and being able to stimulate little absorbed structural modes of the airplane; or
  an air pocket; or
  other types of turbulences.

Preferably, the flight envelope of an airplane being defined by couples of values of altitude and speed available to said airplane, the following successive steps are automatically performed, in step A/:
  a) at least one parameter of the airplane is selected having its value being able to vary during the flight of said airplane;

b) for at least one given value of said selected parameter, theoretical loads are determined, applied on the airplane for all couples of said flight envelope with which theoretical aerodynamic disturbances of a given intensity are respectively associated; and c) for each couple of said flight envelope associated with a theoretical disturbance of a given intensity, said determined theoretical loads associated with said couple are compared with the predefined threshold of loads, so that said load exceeding envelope is determined by the set of couples of said flight envelope for which said associated determined theoretical loads are at least equal to said threshold of loads.

Thus, for a given value of one or more parameters of the airplane, a set of couples of values of altitude and speed (corresponding to the load exceeding envelope) is determined, for which the actual loads generated on the airplane are adapted to be higher than a threshold of loads. This way, during a flight, when the current couple of the airplane corresponds to one of the couples of the load exceeding envelope, the control surfaces of the airplane are preventively deflected so as to avoid any overloads on the wings of the airplane.

Furthermore, said selected parameter of the airplane could belong to the following group of parameters of the airplane:
the mass of said airplane;
the filling level of the tanks in said airplane;
the centering of said airplane.

In a particular embodiment of the present invention:
step b) is repeated for a plurality of given values of said selected parameter; and
in step c), for each one of said given values of the selected parameter and for each couple of said flight envelope, said determined theoretical loads, associated with said couple, are compared with the predefined threshold of loads, so that, for each one of said values of the selected parameter, such a load exceeding envelope is reached, determined by the set of couples of said flight envelope having their associated determined theoretical loads being at least equal to said threshold of loads; and
as a function of a performance criterion in the airplane, an optimum load exceeding envelope is selected amongst said determined load exceeding envelopes. The performance criterion could, for instance, be such that the optimum load exceeding envelope does not interact, or very little, with the operational area of the airplane (corresponding to the couples of values in the flight envelope Dv usually respected by the airplane).

Thus, the plurality of values of the selected parameter of the airplane could correspond to the different values recorded by this parameter during a flight. While establishing a load exceeding envelope for each of the values of the selected parameter, it is possible to determine an optimum load exceeding envelope best meeting said performance criterion of the airplane.

In a preferred embodiment of the present invention:
said control surfaces are high lift flaps being arranged on the internal part of the wings of said airplane; and
in step iii), said flaps are deflected downwards symmetrically with respect to the longitudinal axis of the airplane.

Thus, the lift center can be managed along the airfoils of the airplane by modifying the lift distribution around an optimized configuration of the airplane, via internal flaps being deflected. Deflecting flaps downwards, the airfoils are mainly loaded at the level of the root of the wings.

In an alternative preferred embodiment:
said control surfaces comprise:
internal flaps being arranged on the internal part of the wings of said airplane; and
external flaps being arranged on the external part of the wings of said airplane;
and, in step iii):
said internal flaps and said external flaps are independently deflected; and
said internal flaps and said external flaps are respectively deflected symmetrically with respect to the longitudinal axis of the airplane.

Thus, the move of the lift center toward the root of the wings can be enhanced through deflecting the internal flaps downwards and, optionally, the external flaps slightly upwards.

Furthermore, said predefined load threshold could be equal to a predetermined percentage of the actual dimensioning loads of the wings of said airplane.

Advantageously, said control surfaces could be maintained deflected at least during a predefined time delay, so as to avoid too intense an activity of the control surfaces.

Furthermore, the present invention relates to a device for reducing the actual loads generated on an airplane by an aerodynamic disturbance, said airplane comprising control surfaces arranged on its wings.

According to this invention, said device is remarkable in that it comprises:
means for determining a load exceeding envelope, for which the actual loads applied on said airplane are able to be at least equal to a predefined load threshold; and
the following means repeatedly implementing the corresponding operations:
means for performing a monitoring allowing to detect that said airplane flies in said load exceeding envelope;
means for determining, when said airplane is in said load exceeding envelope, deflection orders of at least some of said control surfaces for reducing the loads applied on said airplane, such deflection orders being such that they generate a deflection of said control surfaces respectively according to a particular deflection angle; and
means for applying said deflection orders to said control surfaces.

The present invention also relates to an airplane comprising a device such as described herein above.

BRIEF DESCRIPTION OF THE DRAWINGS

The Figures of the appended drawing will better explain how this invention can be implemented. In these FIGS, like reference numerals relate to like components.

DETAILED DESCRIPTION

Figure 1:
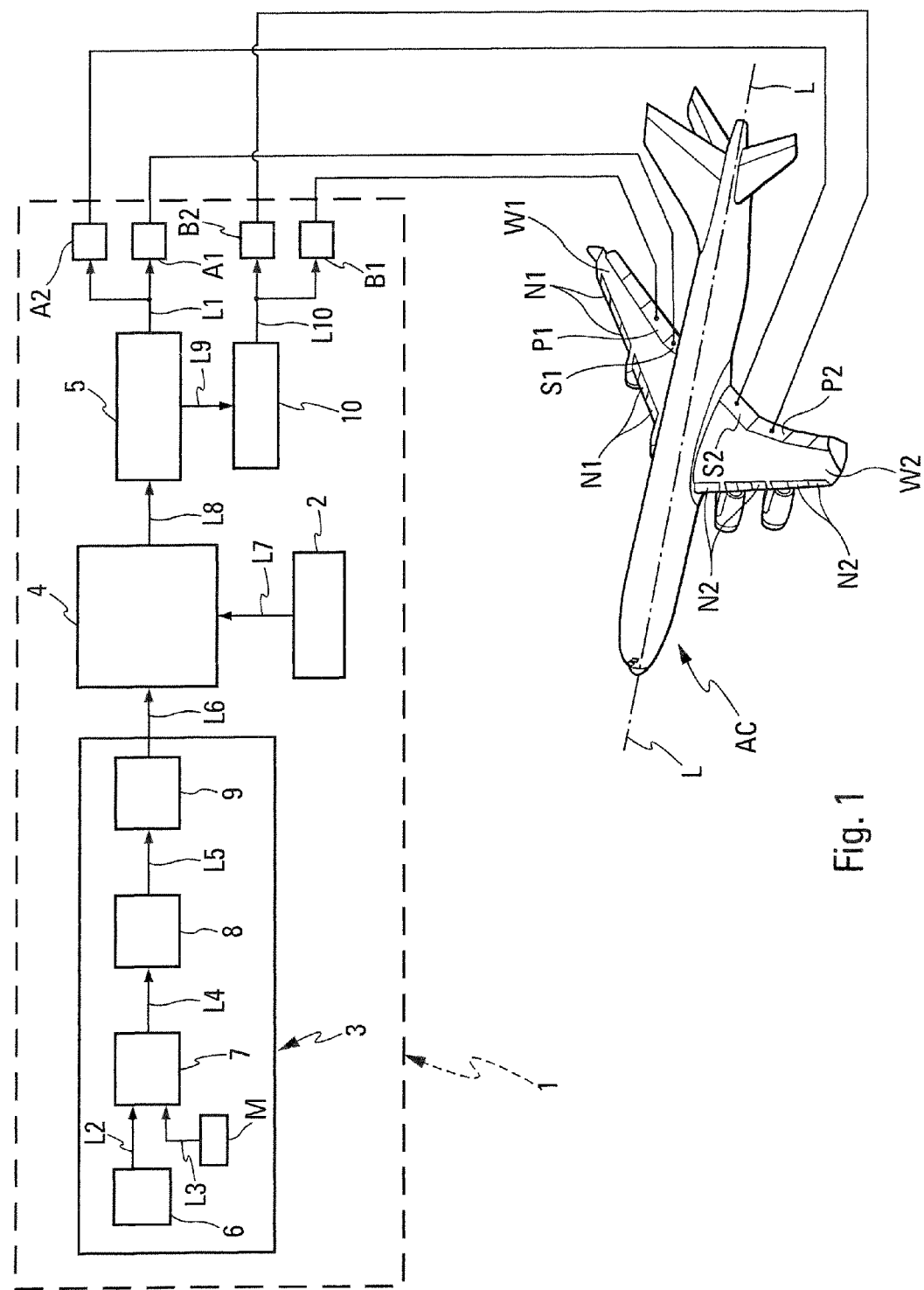
FIG. 1 shows a block diagram of a load reducing device according to this invention, arranged on-board a civil jumbo jet.

The device 1 according to this invention and schematically shown on FIG. 1 is intended for reducing the actual loads applied, more specifically, on the wings W1 and W2 of an airplane AC (for instance a transport airplane such as illustrated on FIG. 2), said loads being generated by an aerodynamic disturbance. Within the scope of the present invention, it is considered that an aerodynamic disturbance could be:

a discrete gust, that is a simplified wind modeling aimed at representing an isolated turbulence of an extreme intensity; or a continuous turbulence, that is a wind modeling aimed at representing atmospheric disturbances lasting for a long period of time and able to stimulate little absorbed structural modes of the airplane; or an air pocket; or other types of turbulences.

For the sake of clarity, the device 1 of this invention is shown outside the airplane AC, whereas it is actually arranged on-board the latter. It should however be noticed that, alternatively, at least some of the hereinafter means of the device 1 could not be arranged on-board the airplane AC.

Figure 2:
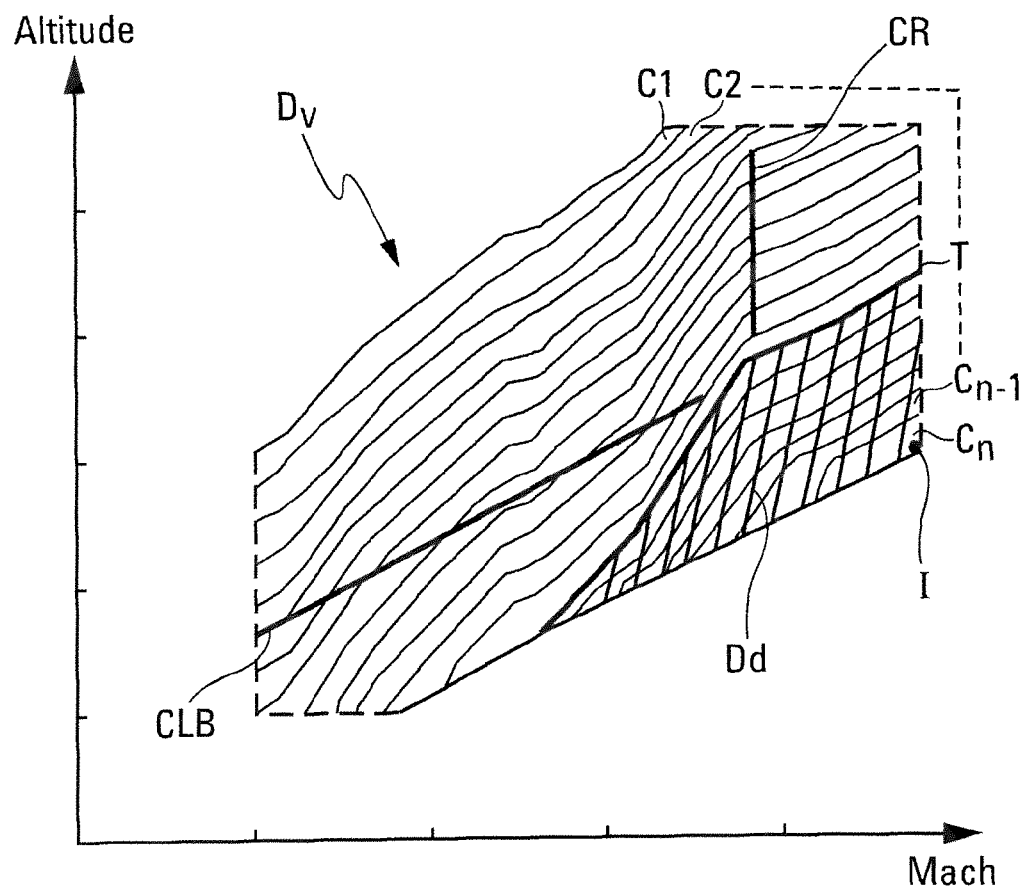
FIG. 2 is a diagram showing an example of an optimum load exceeding envelope determined by the device on FIG. 1.

As shown on FIG. 1, the device 1 of this invention comprises:

a set 2 of sources of information being able to usually measure the values of parameters of the airplane (such as speed, altitude, mass, etc.);

means 3 for determining an optimum load exceeding envelope Dd (see FIG. 2), for which the actual loads applied on said airplane AC are able to be at least equal to a critical predefined load threshold T (FIG. 2). Such a load threshold T could be considered as equal to a given percentage (for instance 92%) of the dimensioning loads of the airplane AC. Dimensioning loads means the maximum loads the structure parts being taken into consideration are able to withstand (that is the airfoils of the airplane AC) without permanent deformations occurring;

means 4 for performing a monitoring allowing to detect that the airplane AC flies in the optimum load exceeding envelope Dd determined by the means 3;

means 5 for determining, when the airplane AC flies in the optimum load exceeding envelope Dd, deflection orders, to be set forth later on, of control surfaces S1 and S2 of the airplane AC. Such control surfaces S1 and S2 are arranged on the wings of said airplane AC. According to the invention, said deflection orders are such that they generate a preventive deflection of said control surfaces S1 and S2 downwards for counteracting the effects of a possible actual aerodynamic disturbance; and usual actuating means A1 and A2. Each one of such actuating means A1, A2 is associated with one of said control surfaces S1, S2. Such actuating means A1 and A2 receive the deflection orders determined by said means (via a link L1) and generate a deflection angle for each one of said control surfaces S1 and S2.

Thus, the device 1 according to this invention is able to control, during a flight, a static preventive deflection of the control surfaces S1 and S2, as soon as the latter enters the theoretically determined load exceeding envelope, in which it is able to meet aerodynamic disturbances, such a discrete gust or a continuous turbulence for instance, able to generate an increase of the loads on the airfoils (the wings W1, W2) of the airplane AC.

Using such a reduction of loads on the airfoils in the load exceeding envelope, a gain is thus able to be achieved on the structural mass of the airfoils of the airplane AC, allowing in particular to reduce the manufacturing and operating cost of said airplane.

Within the scope of the present invention, a flight envelope Dv (see FIG. 2) means a set of couples of speed and altitude values being theoretically available to the airplane AC during a flight. Such a flight envelope Dv is for instance saved in storing means M belonging to the means 3.

According to this invention, the means 3 for determining an optimum load exceeding envelope Dd comprise:

means 6 for selecting, either automatically or manually by pilots, via a dedicated interface, a parameter of the airplane AC, the value of which is able to vary during a flight of the latter. Such a parameter could be selected amongst the following parameters of the airplane AC:

the mass;

the filling level of the tanks;

the centering.

Obviously, any other type of appropriate existing parameters could be contemplated. It is also possible to simultaneously perform a selection of several parameters of the airplane AC;

means 7 for determining, for a plurality of given values of the selected parameter (received from the means 6 via a link L2), the theoretical loads C1 to Cn (n integer, FIG. 2) applied on the airplane AC for each one of the couples of the flight envelope Dv with which theoretical aerodynamic disturbances of a predefined intensity (resulting, for instance, from a predefined modeling) are respectively associated. The means 7, connected to the means 6 and to the means M via, respectively, the links L2 and L3, are able to receive the plurality of values of the selected parameter and information regarding the flight envelope Dv. It should be noticed that the intensity of a theoretical disturbance associated with a couple of the flight envelope Dv could be a function of the altitude of such a couple. Furthermore, alternatively, for each one of the couples of the flight envelope Dv, the theoretical loads applied on the airplane AC could be determined for one single same value of the selected parameter; and means 8 being formed for comparing, for each one of the values of the selected parameter of the airplane AC, the determined theoretical loads C1 to Cn, associated, respectively, with each one of the couples of the flight envelope DV, at the predefined load threshold T. The means 8 are able to receive the theoretical loads determined C1 to Cn by the means 7, via a link L4. Thus, for each one of said values of the selected parameter, a load exceeding envelope Dd is obtained being determined by the set of the couples of the flight envelope having their associated theoretical loads C1 to Cn being at least equal to the predefined load threshold T. In other words, at the outlet of the means 8, a plurality of load exceeding envelopes Dd is obtained; and means 9 for selecting, as a function of a performance criterion of the airplane AC, the optimum load exceeding envelope Dd amongst the plurality of load exceeding envelopes determined by the means 8 and received via a link L5. The performance criterion could be such that the optimum load exceeding envelope Dd does not interact, or very little, with the operational area of the airplane AC (corresponding to the couples of values of the flight envelope Dv usually followed by the airplane) symbolized by climbing CLB and cruising CR lines on FIG. 2. Such a performance criterion is thus a compromise between the reduction of the loads generated on the airfoils of the airplane AC and the performance of the latter.

It should be appreciated, alternatively or additionally, that the optimum load exceeding envelope is updated during the flight as a function of the variation of one or more parameters of the airplane (for instance the mass).

From the optimum load exceeding envelope Dd, determined by the means 3 and received via a link L6, and the usual couple of the speed and altitude values of the airplane AC received from the set 2 via a link L7, the monitoring means 4 check whether the usual couple of values corresponds to one of the couples of the optimum load exceeding envelope Dd. In the case of a positive check (the usual couple is one of the couples belonging to the optimum load exceeding envelope Dd), the monitoring means 4 emit in outlet, via a link L8, a signal representative of the determined theoretical loads associated with the usual couple, to means 5.

When they receive such a signal, the means 5 determine deflection orders of the control surfaces S1 and S2 using the theoretical loads determined by the means 7 and associated with said usual couple. Said deflection orders are, for instance, obtained by means of a (not shown) matching table associating with given reference loads a particular deflection angle to be applied to the control surfaces S1 and S2. The matching table could be saved in the means 5. Thus, identifying the theoretical loads associated with the usual couple in the matching table, the particular deflection angle to be applied to the control surfaces S1 and S2 can be determined.

The deflection orders thus generated by said means 5 are transmitted to the actuators A1 and A2 that apply them afterwards to said control surfaces S1 and S2. Thereby, such control surfaces S1 and S2 are deflected downwards symmetrically with respect to the longitudinal axis L-L of the airplane AC.

The control surfaces S1 and S2 are preferably deflected by successive angular steps, so as to achieve the particular angle required by the deflection orders.

Furthermore, they could be maintained in such a position during a predetermined time delay so as to avoid to much to and fro motion, so as not to put some strain on the corresponding actuators A1 and A2.

In a preferred embodiment of the present invention, the control surfaces S1 and S2 are internal high lift trailing edge flaps, being arranged on the internal part of the wings W1 and W2 of the airplane AC.

It is additionally possible to deactivate the device 1 of this invention when the mass of the airplane AC is at the most equal to the maximum take off mass of the airplane AC from which a predetermined constant mass has been subtracted, for instance equal to 30 tons (that is Mplane≦M max−30t).

Furthermore, in an alternative preferred embodiment, the device 1 further comprises:
  means 10 being connected to the means 5, via respectively a link L9, and being intended for determining auxiliary deflection orders for the auxiliary control surfaces P1 and P2 of the airplane AC, also arranged on the wings W1 and W2 of the latter. Such auxiliary control surfaces P1 and P2 are deflected symmetrically with respect to the longitudinal axis L-L of the airplane AC. Said auxiliary deflection orders are, for instance, determined using the deflection orders obtained from the means 5; and
  usual actuating means B1 and B2 being connected, via a link L10 to said means 10 and that are able to bring the auxiliary control surfaces P1 and P2 in a position being representative of the auxiliary deflection orders determined by the means 10.

In such an alternative, the control surfaces P1 and P2 are preferably external trailing edge high lift flaps, being arranged on the external part of the wings W1 and W2 of the airplane AC. They could be deflected independently from the internal flaps S1 and S2, so that the deflection angle applied to the internal flaps S1 and S2 and that applied to the external flaps P1 and P2 could be either identical, or different. Moreover, the internal flaps S1, S2 could be deflected in the direction opposite the deflection direction of the external flaps P1, P2.

Furthermore, in another alternative, it could be contemplated that the auxiliary control surfaces are leading edge slats N1 and N2 arranged on the wings of the airplane AC and used as high lift areas.

In the example of FIG. 2, the flight envelope Dv is shown by a diagram of the Mach speed of the airplane AC as a function of its altitude.

As mentioned previously, the climbing line CLB and the crusing line CR bound the operational flight envelope of the airplane AC comprising the couples of the speed and altitude values of the flight envelope Dv generally followed by the airplane AC during a flight.

Moreover, there are represented, on the flight envelope Dv, the theoretical loads C1 to Cn determined by the means 7 for a given value of the parameter of the airplane AC (in the present example, the mass) selected by the means 6.

As shown on FIG. 2, the theoretical loads generated on the airplane AC could be identical for different couples of the flight envelope Dv (being symbolized by the iso-load areas C1 to Cn).

Additionally, the load exceeding envelope Dd (hatched area on FIG. 2) corresponds to the set of the couples of values of the flight envelope Dv for which the associated theoretical loads are at least equal to the load threshold T (for instance equal to 92% of the maximum actual loads the structure of the airplane AC can withstand, obtained on the critical point I).

In such an example, there is no interaction between the operational flight envelope CR and CLB of the airplane AC and the determined load exceeding envelope Dd (those two areas are decorrelated), so that the latter could be considered as optimum.

The invention claimed is:

1. A method for reducing actual loads generated on an airplane by an aerodynamic disturbance, the airplane comprising control surfaces arranged on wings, a flight envelope of the airplane being defined by couples of altitude and speed values available to the airplane, and the method comprising:
  in a preliminary step, a load exceeding envelope is determined, defined by couples of values of altitude and speed available to the airplane, for which the actual loads applied on the airplane are able to be at least equal to a predefined load threshold, wherein determining the load exceeding envelope further includes the following steps (a)-(c) performed in succession automatically:
    (a) at least one parameter of the airplane is selected having its value being able to vary during the flight of the airplane;
    (b) for at least one given value of the selected parameter, theoretical loads are determined, applied on the airplane for all couples of the flight envelope with which theoretical aerodynamic disturbances of a given intensity are respectively associated;
    (c) for each couple of the flight envelope associated with a theoretical disturbance of a given intensity, the determined theoretical loads, associated with the couple, are compared to the predefined load threshold, so that the load exceeding envelope is determined by the set of couples of the flight envelope for which the associated determined theoretical loads are at least equal to the load threshold; and
  during a flight of the airplane, the following steps are repeatedly and automatically performed:

(i) a monitoring is achieved for the current altitude and speed of the airplane for detecting whether the latter flies in the load exceeding envelope;

(ii) when the airplane flies in the load exceeding envelope, deflection orders are determined of at least some of the control surfaces for reducing the actual loads applied on the airplane, the deflection orders being such that they generate a deflection of the control surfaces respectively according to a particular deflection angle; and (iii) the determined deflection orders are applied to the control surfaces.

2. The method according to claim 1, wherein step (b) is repeated for a plurality of given values of the selected parameter; and wherein in step (c), for each one of the given values of the selected parameter and for each couple of the flight envelope, the determined theoretical loads, associated with the couple are compared to the predefined load threshold, so that, for each one of the values of the selected parameter, such a load exceeding envelope is obtained, determined by the set of couples of the flight envelope having the associated determined theoretical loads being at least equal to the load threshold; and wherein as a function of a performance criterion of the airplane, an optimum load exceeding envelope is selected amongst the determined load exceeding envelopes.

3. The method according to claim 1, wherein the parameter of the selected airplane belongs to the following group of parameters of the airplane:
the mass of the airplane;
the filling level of the tanks of the airplane; and
the centering of the airplane.

4. The method according to claim 1, wherein the control surfaces are high lift flaps being arranged on the internal part of the wings of the airplane; and wherein in step (iii), the flaps are deflected downwards symmetrically with respect to the longitudinal axis of the airplane.

5. The method according to claim 1, wherein the control surfaces comprise:
internal flaps being arranged on the internal part of the wings of the airplane; and
external flaps being arranged on the external part of the wings of the airplane;
wherein in step (iii): the internal flaps and the external flaps are independently deflected; and the internal flaps and the external flaps are respectively deflected symmetrically with respect to the longitudinal axis of the airplane.

6. The method according to claim 1, wherein the predefined load threshold is equal to a predetermined percentage of actual dimensioning loads of the wings of the airplane.

7. The method according to claim 1, wherein the control surfaces are maintained deflected at least during a predefined time delay.

8. A device for reducing actual loads generated on an airplane by an aerodynamic disturbance, the airplane comprising control surfaces arranged on wings, a flight envelope of the airplane being defined by couples of altitude and speed values available to the airplane, the device comprising:
a first set of means for determining a load exceeding envelope for which the actual loads applied on the airplane are able to be at least equal to a predefined load threshold, the first set comprising;
means for selecting at least one parameter of the airplane having its value being able to vary during the flight of the airplane;
means for determining theoretical loads, for at least one given value of the selected parameter, applied on the airplane for all couples of the flight envelope with which theoretical aerodynamic disturbances of a given intensity are respectively associated; and
means for comparing, for each couple of the flight envelope associated with a theoretical disturbance of a given intensity, the determined theoretical loads associated with the couple, to the predefined load threshold so that the load exceeding envelope is determined by the set of couples of the flight envelope for which the associated determined theoretical loads are at least equal to the load threshold; and
a second set of means implementing repeatedly the corresponding operations, the second set comprising:
means for performing a monitoring allowing to detect that the airplane flies in the load exceeding envelope;
means for determining, when the airplane flies in the load exceeding envelope, deflection orders of at least some of the control surfaces for reducing the actual loads applied on the airplane, the deflection orders being such that they generate a deflection of the control surfaces respectively according to a particular deflection angle; and
means for applying the deflection orders to the control surfaces.

9. An airplane, comprising:
control surfaces arranged on wings, a flight envelope of the airplane being defined by couples of altitude and speed values available to the airplane; and
a device for reducing actual loads generated on an airplane by an aerodynamic disturbance, the device comprising:
a first set of means for determining a load exceeding envelope, for which the actual loads applied on the airplane are able to be at least equal to a predefined load threshold, the first set comprising:
means for selecting at least one parameter of the airplane having its value being able to vary during the flight of the airplane;
means for determining theoretical loads, for at least one given value of the selected parameter, applied on the airplane for all couples of the flight envelope with which theoretical aerodynamic disturbances of a given intensity are respectively associated; and
means for comparing, for each couple of the flight envelope associated with a theoretical disturbance of a given intensity, the determined theoretical loads associated with the couple, to the predefined load threshold so that the load exceeding envelope is determined by the set of couples of the flight envelope for which the associated determined theoretical loads are at least equal to the load threshold; and
a second set of means implementing repeatedly the corresponding operations, the second set comprising:
means for performing a monitoring allowing to detect that the airplane flies in the load exceeding envelope;
means for determining, when the airplane flies in the load exceeding envelope, deflection orders of at least some of the control surfaces for reducing the actual loads applied on the airplane, the deflection orders being such that they generate a deflection of the control surfaces respectively according to a particular deflection angle; and
means for applying the deflection orders to the control surfaces.

* * * * *